US006700837B2

(12) United States Patent
Verschuren

(10) Patent No.: US 6,700,837 B2
(45) Date of Patent: Mar. 2, 2004

(54) METHOD AND APPARATUS FOR READING FROM A DOMAIN EXPANSION RECORDING MEDIUM BY USING AN EXTERNAL MAGNETIC FIELD TO FORM AND REMOVE THE EXPANDED DOMAIN

(75) Inventor: Coen Adrianus Verschuren, Eindhoven (NL)

(73) Assignee: Koninklijke Philips Electronics N.V., Eindhoven (NL)

(*) Notice: Subject to any disclaimer, the term of this patent is extended or adjusted under 35 U.S.C. 154(b) by 0 days.

(21) Appl. No.: 10/174,321

(22) Filed: Jun. 18, 2002

(65) Prior Publication Data

US 2002/0191495 A1 Dec. 19, 2002

(30) Foreign Application Priority Data

Jun. 18, 2001 (EP) ........................................ 01202320

(51) Int. Cl.$^{7}$ ........................................ G11B 11/00
(52) U.S. Cl. ........................ 369/13.09; 369/13.14
(58) Field of Search ........................ 369/13.09, 13.08, 369/13.06, 13.05, 13.14; 360/59; 428/694 ML, 694 MM

(56) References Cited

U.S. PATENT DOCUMENTS 5,963,512 A * 10/1999 Inoue et al. ............ 369/13.09
6,192,008 B1 * 2/2001 Kim ........................ 369/13.02
6,388,954 B1 * 5/2002 Awano et al. ............ 369/13.02
6,477,118 B1 * 11/2002 Awano et al. ............ 369/13.14
6,584,044 B2 * 6/2003 Tani et al. ............... 369/13.14

FOREIGN PATENT DOCUMENTS

| | | |
|---|---|---|
| EP | 0913818 A1 | 6/1999 |
| EP | 0915462 A1 | 12/1999 |
| EP | 0984445 A1 | 8/2000 |
| JP | A260079 | 1/2002 |

OTHER PUBLICATIONS

N. Takagi et al., "MAMMOS Readout with Magnetic Field Modulation", Proceedings of Magneto–Optical Recording International Symposium, 1999, J. Magn. Soc. Japan, vol. 23, Supplement No. S1 (1999), pp. 161–164.

* cited by examiner

*Primary Examiner*—Tan Dinh

(57) ABSTRACT

The present invention relates to a method and an apparatus for reading information from a domain expansion magneto-optical recording medium, wherein the duration of the expansion direction of an external magnetic field is determined according to the upper limiting frequency of the reading system. The reading density and power margin can thus be improved.

6 Claims, 2 Drawing Sheets

STORAGE LAYER
T1
$H_{ext}$
T2
OVERLAP
MAMMOS

METHOD AND APPARATUS FOR READING FROM A DOMAIN EXPANSION RECORDING MEDIUM BY USING AN EXTERNAL MAGNETIC FIELD TO FORM AND REMOVE THE EXPANDED DOMAIN

DESCRIPTION

The present invention relates to a method and apparatus for reading information from a magneto-optical recording medium, such as a MAMMOS (Magnetic AMplifying Magneto-Optical System) disk, comprising a recording or storage layer and an expansion or read-out layer.

In magneto-optical storage systems, the minimum width of the recorded marks is determined by the diffraction limit, i.e. by the Numerical Aperture (NA) of the focussing lens and the laser wavelength. A reduction of the width is generally based on shorter wavelength lasers and higher NA focussing optics. During magneto-optical recording, the minimum bit length can be reduced to below the optical diffraction limit by using Laser Pulsed Magnetic Field Modulation (LP-MFM). In LP-MFM, the bit transitions are determined by the switching of the field and the temperature gradient induced by the switching of the laser. For read-out of the small crescent shaped marks recorded in this way, Magnetic Super Resolution (MSR) or Domain Expansion (DomEx) methods have to be used. These technologies are based on recording media with several magneto-static or exchange-coupled RE-TM layers. According to MSR, a read-out layer on a magneto-optical disk is arranged to mask adjacent bits during reading while, according to domain expansion, a domain in the center of a spot is expanded. Because of the advantage of the domain expansion technique over MSR, bits with a length below the diffraction limit can be detected with a similar signal-to-noise ratio (SNR) as bits with a size comparable to the diffraction limited spot. MAMMOS is a domain expansion method based on magneto-statically coupled storage and read-out layers, wherein a magnetic field modulation is used for expansion and collapse of expanded domains in the read-out layer.

Thus, in the above mentioned domain expansion techniques, like MAMMOS, a written mark from the storage layer is copied to the read-out layer upon laser heating with the aid of an external magnetic field. Due to the low coercitivity of this read-out layer, the copied mark will expand to fill the optical spot and can be detected with a saturated signal level which is independent of the mark size. Reversal of the external magnetic field collapses the expanded domain. A space in the storage layer, on the other hand, will not be copied and no expansion occurs.

The resolution of the MAMMOS read-out process, i.e. the smallest bit size that can be reproduced without interference from neighbouring bits, is limited by the spatial extent of the copy process, i.e. the so-called copy or detection window. This copy window decreases when the read-out laser power is reduced. On the other hand, a minimum laser power is required to enable the copy process. Thus, it is clear that the copy window should be as small as possible so as to reach a high storage density. This can be achieved by using a very localized, sharp temperature profile, for example, with high NA (Numerical Aperture) optics and shorter wavelength laser light. More generally speaking, successful MAMMOS read-out requires a laser power larger than the minimum laser power, while interference of neighbouring bits should be avoided as this leads to additional false MAMMOS signals, i.e. so-called 'double peaks'.

FIG. 2 shows a signalling diagram of a conventional read-out strategy. The duration of the expansion direction of the external magnetic field (upper level of $H_{ext}$) equals the duration of the collapse direction (lower level of $H_{ext}$). The size of the copy window w determines the minimum bit length b: $b_{min}=2$ w. Since this size condition is fulfilled in FIG. 2, correct MAMMOS peaks are obtained for each mark region (upward magnetization) in the storage layer. The overlap curve indicates the amount of overlap of the copy window and a mark region. If such an overlap reaches to a preceding or subsequent expansion period of the external magnetic field within the same copy window, so-called "double peaks" are generated in the MAMMOS signal.

FIG. 3 shows a signalling diagram of the conventional read-out strategy, where the copy window is too large or the bit length b too small, such that w>b/2. Hence, undesired double peaks appear in the MAMMOS signal.

Thus, in general, successful MAMMOS read-out requires a laser power larger than the minimum laser power, while interference of neighbouring bits should be avoided as this leads to additional false MAMMOS signals.

If the duty cycle of the external magnetic field is adjusted so that the duration of the expansion or up direction is chosen to be smaller than the duration of the collapse or down direction, unwanted double peaks can be suppressed. As an example, the documents EP 0 913 818 A1 and EP 0 915 462 A1 suggest a smaller expansion duration and a range $0.15 \leqq T1/(T1+T2) \leqq 0.9$, wherein T1 denotes the duration of domain expansion and T2 denotes the duration of domain erasure (i.e. collapse). However, according to this suggested range, the expansion duration may as well be larger than the collapse duration.

It is an object of the present invention to provide a method and apparatus for reading from a domain expansion recording medium which enable the power margin to be optimized and the resolution improved for the same disk stack and recorder optics.

This object is achieved by a method as claimed in claim 1 and by an apparatus as claimed in claim 4.

These and other aspects of the invention are apparent from and will be elucidated with reference to the embodiments described hereinafter.

Figure 1:
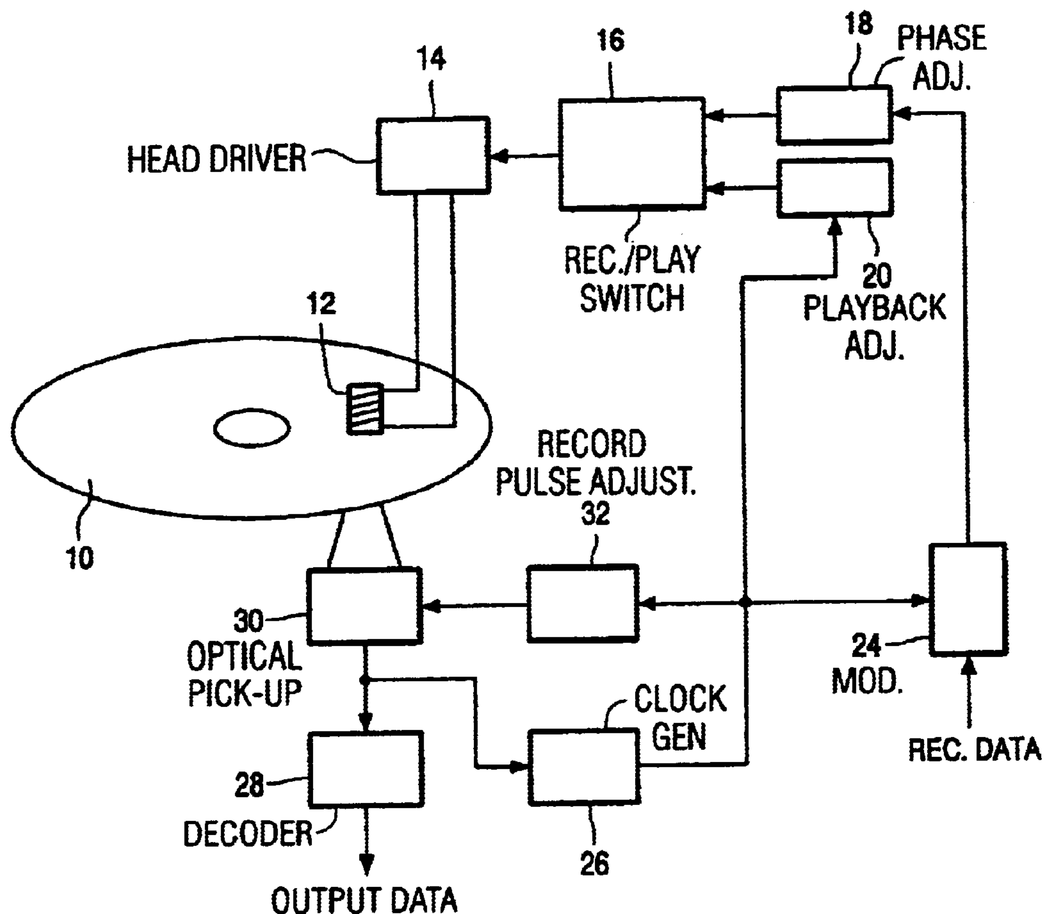
FIG. 1 shows a diagram of a magneto-optical disk player according to the preferred embodiment.
Figure 2:
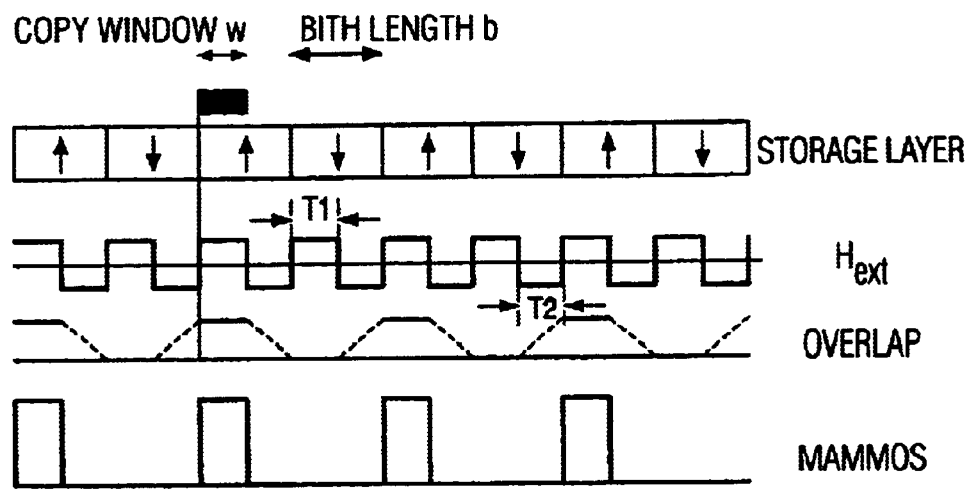
FIG. 2 shows a conventional read-out strategy with an external magnetic field having equal durations in the expansion direction and then collapse direction.
Figure 3:
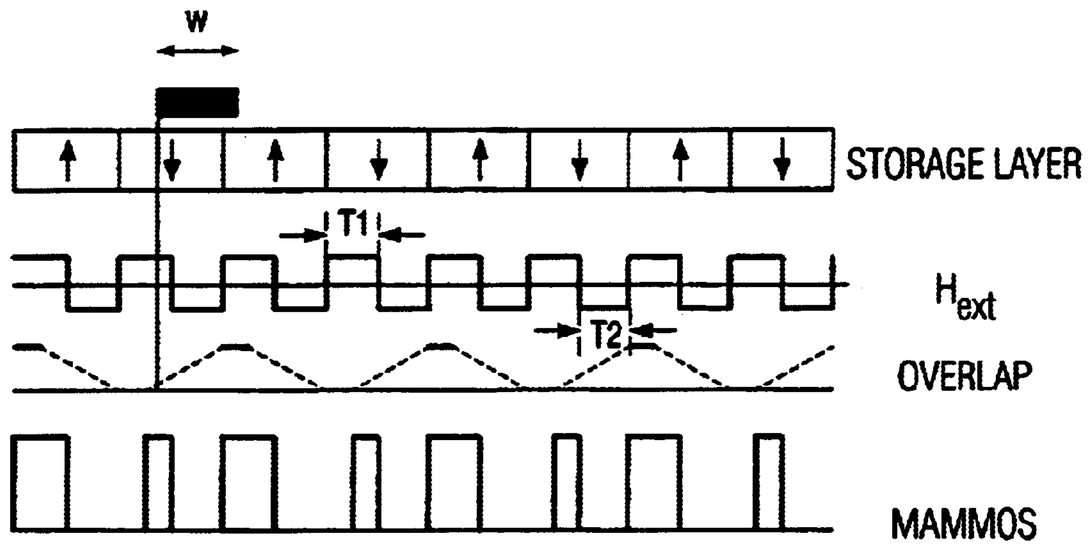
FIG. 3 shows a conventional read-out strategy with an external magnetic field having equal durations in the expansion direction and the collapse direction, double peaks being generated in the MAMMOS signal due to an excessive copy window.

The preferred embodiments will now be described on the basis of a MAMMOS disk player as shown in FIG. 1.

FIG. 1 shows diagrammatically the construction of the disk player. The disk player comprises an optical pick-up unit 30 having a laser light radiating section for irradiation of an magneto-optical recording medium 10, such as a magneto-optical disk, with light that has been converted, during recording, to pulses with a period synchronized with code data, and also comprises a magnetic field applying section with a magnetic head 12 which applies a magnetic field in a controlled manner at the time of recording and playback on the magneto-optical recording medium 10. In the optical pick-up unit 30 a laser is connected to a laser driving circuit which receives recording pulses from a recording pulse adjusting unit 32 so as to control the pulse amplitude and timing of the laser of the optical pick-up unit 30. The recording pulse adjusting circuit 32 receives a clock signal from a clock generator 26 which may comprise a PLL (Phase Locked Loop) circuit.

It is to be noted that, for reasons of simplicity, the magnetic head 12 and the optical pick-up unit 30 are shown on opposite sides of the disk 10 in FIG. 1. However, according to the preferred embodiment they should be arranged on the same side of the disk 10.

The magnetic head 12 is connected to a head driver unit 14 and receives, at the time of recording, code-converted data from a modulator 24 via a phase adjusting circuit 18. The modulator 24 converts input recording data to a prescribed code.

At the time of playback, the head driver 14 receives a clock signal via a playback adjusting circuit 20, from the clock generator 26, the playback adjusting circuit 20 generating a synchronization signal for adjusting the phase and pulse amplitude applied to the magnetic head 12. A recording/playback switch 16 is provided for switching or selecting the respective signal to be supplied to the head driver 14 at the time of recording and at the time of playback.

Furthermore, the optical pick-up unit 30 comprises a detector for detecting laser light reflected from the magneto-optical recording medium 10 and for generating a corresponding reading signal applied to a decoder 28 which is arranged to decode the reading signal so as to generate output data. Furthermore, the reading signal generated by the optical pick-up unit 30 is applied to a clock generator 26 in which a clock signal is extracted from embossed clock marks of the magneto-optical recording medium 10 and which applies the clock signal for synchronization purposes to the recording pulse adjusting circuit 32, the playback adjusting circuit 20, and the modulator 24. In particular, a data channel clock may be generated in the PLL circuit of the clock generator 26.

In the case of data recording, the laser of the optical pick-up unit 30 is modulated with a fixed frequency, corresponding to the period of the data channel clock, and the data recording area or spot of the rotating magneto-optical recording medium 10 is locally heated at equal distances. Additionally, the data channel clock output by the clock generator 26 controls the modulator 24 to generate a data signal with the standard clock period. The recording data is modulated and code-converted by the modulator 24 to obtain binary runlength information corresponding to the information of the recording data.

The structure of the magneto-optical recording medium 10 may correspond to the structure described in JP-A-2000-260079.

According to the preferred embodiment, the playback adjusting circuit 20 is arranged to set the duty cycle of the signal supplied, via the head driver 14, to the coil of the magnetic head 12 so as to provide a smallest duration of the expansion direction of the external magnetic field. Thus, the time fraction for expansion is reduced to a minimum allowable value, thus allowing a smallest channel bit length and hence a maximum recording density. On the other hand, in the case of longer channel bit lengths, the minimum time fraction for expansion allows a high flexibility in the size of the copy window, thus optimizing the power margin.

Figure 4:
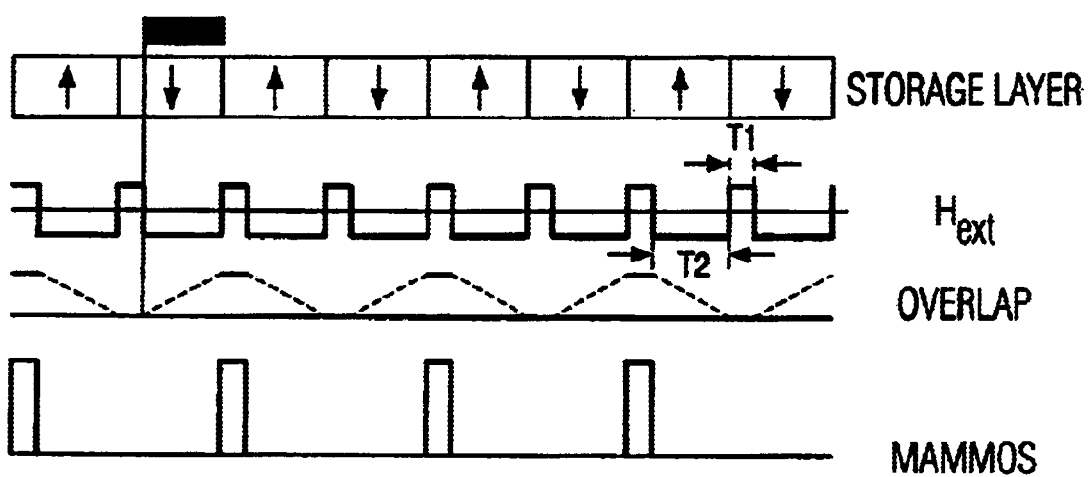
FIG. 4 shows a read-out strategy according to the preferred embodiment.

FIG. 4 shows a signalling diagram of a read-out strategy according to the preferred embodiment, where the duration of the expansion direction of the external magnetic field is adjusted to be as small as possible by the playback adjusting circuit 20.

A general definition for the resolution is given by the following equation:

$$w < v\ T2, \text{ with } b = v(T1 + T2),$$

wherein v denotes the linear disk velocity of the recording medium 10, T1 the duration of the expansion direction, and T2 the duration of the collapse direction.

Thus, for T1<<T2, larger copy windows are allowed for the same bit length and smaller bits can be read with the same copy window as for the current situation (where T1<≈T2), as can be gathered from the following equations:

$$w_{max} := b - v\ T1$$

$$b_{min}:\ w + v\ T1.$$

However, when the time for expansion is substantially reduced, the time for detecting the MAMMOS signal is also reduced. This means that a faster detector is required and that the bandwidth of the detection electronics has to be increased. In other words, the duration T1 of the expansion direction of the external magnetic field (which determines the maximum density and/or optimum power margin) is determined or set based on the upper limiting frequency of the reading system comprising the detection electronics and/or the magnetic field generating electronics. This upper limiting frequency can be determined based on e.g. the bandwidth of the coil of the magnetic head 12 and its driver 14, the disk material (i.e. mainly expansion/collapse speed of the expanded domains) and/or the disk speed, or the like.

Thus, a modification of the coil and coil-driver hardware for generating the appropriate high frequency field pulses can be used to improve the resolution and power margin results derived from better optics, stack designs, etc.

Preferably, the ratio of the expansion duration T1 to the collapse duration T2 should be selected in a range T1/(T1+T2)<0.15.

Applying the above rule to a write strategy with asymmetric sub-portions, where a bit region is recorded as a sequence of a small sub-mark region b↑and a subsequent larger non-mark region b↓ (i.e. b↑+b↓=b), even larger windows are allowed for correct read-out. The maximum allowed window is then given by:

$$w_{max} = b + b{\downarrow} - exp = 2b - b{\uparrow} - \text{exp},$$

wherein exp corresponds to the expansion duration T1 multiplied by disk velocity v to obtain the corresponding length. This corresponds to minimum recording bit length:

$$b_{min} = [w + b{\uparrow} + \text{exp}]/2.$$

As an example for a copy window with a length w=55 nm (achieved experimentally with NA=0.60, 660 nm laser, v=1 m/s), an expansion duration T1=10 ns, and a sub-mark length b↑=25 nm, the following minimum recording bit length can be achieved:

$$b_{min} = [55\ nm + 25\ nm + 10\ nm]/2 = 45\ nm$$ (compared to the conventional bit length of 110 nm).

Thus, a considerable increase in the recording density can be achieved at a moderate size of the copy window allowing a sufficient power margin.

The present invention can be applied to any reading system for a domain expansion recording medium where an alternating external magnetic field is applied to expand and collapse a domain in the read-out layer. The preferred embodiments may thus vary within the scope of the attached claims.

What is claimed is:

1. A method of reading information from a magneto-optical recording medium (10), comprising a storage layer and a read-out layer, said method comprising the steps of:

copying a written mark from said storage layer to said read-out layer upon laser heating with the aid of an external magnetic field, thus forming an expanded domain in said read-out layer;

removing said expanded domain from said readout layer by reversing the direction of said external magnetic field, and setting the duration of the expansion direction of said external magnetic field according to the upper limiting frequency of the reading system.

2. A method as claimed in claim 1, wherein the ratio of the duration (T1) of the expansion direction to the sum of the durations of said expansion direction and the removal direction is set to a value smaller than 0.15.

3. A method as claimed in claim 1, wherein said upper limiting frequency is determined on the basis of the bandwidth of the coil of the magnetic head (12) and its driver (14), the disk material and/or the disk speed.

4. A reading apparatus for reading information from a magneto-optical recording medium (10) comprising a storage layer and a read-out layer, said apparatus comprising:

reading means (12, 30) for copying a written mark from said storage layer to said read-out layer upon laser heating with the aid of an external magnetic field, so as to form an expanded domain in said read-out layer, and for removing said expanded domain from said read-out layer by reversing the direction of said external magnetic field, and setting means (20) for setting the duration of the expansion direction of said external magnetic field according to the upper limiting frequency of said reading system.

5. A reading apparatus as claimed in claim 4, wherein said setting means (20) are arranged to set the ratio of the duration (T1) of the expansion direction and the sum of the durations of said expansion direction and the removal direction to a value smaller than 0.15.

6. An apparatus as claimed in claim 4, wherein said reading apparatus is a disk player for MAMMOS disks.

* * * * *